US008752627B2

(12) United States Patent
Hartman et al.

(10) Patent No.: US 8,752,627 B2
(45) Date of Patent: Jun. 17, 2014

(54) SYSTEM AND METHOD FOR LOW DAMAGE FRACTURING

(71) Applicant: Schlumberger Technology Corporation, Sugar Land, TX (US)

(72) Inventors: Ryan Hartman, Northport, AL (US); Mohan K. R. Panga, Novosibirsk (RU); Bruno Drochon, Houston, TX (US); John W. Still, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/911,131

(22) Filed: Jun. 6, 2013

(65) Prior Publication Data
US 2013/0264055 A1  Oct. 10, 2013

Related U.S. Application Data

(63) Continuation of application No. 12/870,937, filed on Aug. 30, 2010, now Pat. No. 8,496,056, which is a continuation-in-part of application No. 12/174,137, filed on Jul. 16, 2008, now Pat. No. 7,784,541.

(60) Provisional application No. 60/951,780, filed on Jul. 25, 2007.

(51) Int. Cl.
*E21B 43/267* (2006.01)
(52) U.S. Cl.
USPC .............. 166/280.1; 166/308.1; 166/308.2; 166/308.3; 507/923; 507/924
(58) Field of Classification Search
None
See application file for complete search history.

(56) References Cited

U.S. PATENT DOCUMENTS

| 4,051,900 A | 10/1977 | Hankins |
| 4,387,769 A | 6/1983 | Erbstoesser et al. |
| 4,526,695 A | 7/1985 | Erbstoesser et al. |
| 5,518,996 A | 5/1996 | Maroy et al. |

(Continued)

FOREIGN PATENT DOCUMENTS

| EP | 1236701 | 9/2002 |
| GB | 2277543 | 11/1994 |
| WO | 2004038176 | 5/2004 |

OTHER PUBLICATIONS

Albertsson, et al., "Aliphatic Polyesters: Synthesis, Properties and Applications," Advances in Polymer Science: Degradable Aliphatic Polyesters, 2002, pp. 1-40, vol. 157, Springer-Verlag Berlin Heidelberg 2002.

(Continued)

*Primary Examiner* — George Suchfield
(74) *Attorney, Agent, or Firm* — Matthieu Vandrmolen; Rachel E. Greene; Tim Curington

(57) ABSTRACT

A method of fracturing a subterranean formation comprising at least in part shale formation, comprises providing a carrier fluid; providing a particulate blend including a first amount of particulates having a first average particle size between about 100 and 2000 microns and a second amount of particulates having a second average particle size between about three and twenty times smaller than the first average particle size, such that a packed volume fraction of the particulate blend exceeds 0.75; combining the carrier fluid and the particulate blend into a fracturing slurry; fracturing the formation with the fracturing slurry to create at least a fracture; and removing the second amount of particulates from the fracture.

13 Claims, 3 Drawing Sheets

(56) References Cited

U.S. PATENT DOCUMENTS

| | | |
|---|---|---|
| 5,979,557 A | 11/1999 | Card et al. |
| 6,435,277 B1 | 8/2002 | Qu et al. |
| 6,599,863 B1 | 7/2003 | Palmer et al. |
| 6,656,265 B1 | 12/2003 | Garnier et al. |
| 6,874,578 B1 | 4/2005 | Garnier et al. |
| 7,007,754 B2 * | 3/2006 | Fanguy et al. ............... 166/292 |
| 7,044,220 B2 | 5/2006 | Nguyen et al. |
| 7,084,095 B2 | 8/2006 | Lee et al. |
| 7,166,560 B2 | 1/2007 | Still et al. |
| 7,219,731 B2 | 5/2007 | Sullivan et al. |
| 7,237,610 B1 | 7/2007 | Saini et al. |
| 7,265,079 B2 | 9/2007 | Willberg et al. |
| 7,482,311 B2 | 1/2009 | Willberg et al. |
| 7,559,369 B2 | 7/2009 | Roddy et al. |
| 7,784,541 B2 | 8/2010 | Hartman et al. |
| 7,789,146 B2 | 9/2010 | Panga et al. |
| 7,954,548 B2 | 6/2011 | Curimbaba et al. |
| 8,167,043 B2 | 5/2012 | Willberg et al. |
| 8,496,056 B2 * | 7/2013 | Hartman et al. .......... 166/280.1 |
| 2003/0060374 A1 | 3/2003 | Cooke, Jr. |
| 2003/0134751 A1 | 7/2003 | Lee et al. |
| 2004/0094300 A1 | 5/2004 | Sullivan et al. |
| 2004/0152601 A1 | 8/2004 | Still et al. |
| 2004/0261995 A1 | 12/2004 | Nguyen et al. |
| 2004/0261996 A1 | 12/2004 | Munoz, Jr. et al. |
| 2005/0006089 A1 * | 1/2005 | Justus et al. ............. 166/250.01 |
| 2005/0037928 A1 * | 2/2005 | Qu et al. ..................... 507/100 |
| 2005/0161220 A1 | 7/2005 | Todd et al. |
| 2005/0252659 A1 | 11/2005 | Sullivan et al. |
| 2006/0175059 A1 | 8/2006 | Sinclair et al. |
| 2006/0185848 A1 | 8/2006 | Surjaatmadja et al. |
| 2006/0289160 A1 | 12/2006 | van Batenburg et al. |
| 2007/0238623 A1 | 10/2007 | Saini et al. |
| 2008/0217012 A1 * | 9/2008 | Delorey et al. .............. 166/300 |
| 2009/0025932 A1 | 1/2009 | Panga et al. |
| 2009/0301725 A1 * | 12/2009 | Case et al. ................ 166/308.1 |

OTHER PUBLICATIONS

Stridsberg, et al., "Controlled Ring-Opening Polymerization: Polymers with designed Macromolecular Architecture," Advances in Polymer Science: Degradable Aliphatic Polyesters, 2002, pp. 41-65, vol. 157, Springer-Verlag Berlin Heidelberg 2002.

Edlund, et al., "Degradable Polymer Microspheres for Controlled Drug Delivery," Advances in Polymer Science: Degradable Aliphatic Polyesters, 2002, pp. 67-112, vol. 157, Springer-Verlag Berlin Heidelberg 2002.

Hakkarainen, "Aliphatic Polyesters: Abiotic and Biotic Degradation and Degradation Products," Advances in Polymer Science: Degradable Aliphatic Polyesters, 2002, pp. 113-138, vol. 157, Springer-Verlag Berlin Heidelberg 2002.

* cited by examiner

SYSTEM AND METHOD FOR LOW DAMAGE FRACTURING

CROSS-REFERENCE TO RELATED APPLICATIONS

This application is a continuation of U.S. application Ser. No. 12/870,937 filed on Aug. 30, 2010 published as U.S. 2011/0005760 which is a continuation-in-part application of application Ser. No. 12/174,137, now U.S. Pat. No. 7,784,541, entitled "SYSTEM AND METHOD FOR LOW DAMAGE FRACTURING" filed on Jul. 16, 2008 and claiming priority to U.S. Provisional Application No. 60/951,780 entitled "FORMATION PERMEABILITY CONTROL FLUIDS HAVING OPTIMIZED PACKING VOLUME FRACTION" filed Jul. 25, 2007, which are all hereby in their entirety incorporated by reference.

FIELD OF THE INVENTION

The present invention relates to techniques for proppant based hydraulic fracturing. More particularly, it relates to fracturing with low fluid damage.

BACKGROUND

Fracture treatments are utilized to improve fluid conductivity between a wellbore and a formation of interest. Hydraulic fracture treatments are typically used in low-permeability formations, or in any formation to bypass near-wellbore permeability damage. A typical treatment injects a viscous fluid to open a fracture of a desired geometry, and the viscous fluid carries a proppant into the opened fracture to maintain conductivity in the fracture after the treatment is completed. Viscous fluids have features that damage the permeability of the proppant pack and/or the formation near the fracture. For example, the fluid may have gel that is deposited in the fracture, the fluid may have surfactants that leave unbroken micelles in the fracture or change the wettability of the formation in the region of the fracture. Breakers are utilized in many treatments to mitigate fluid damage in the fracture. However, breakers and other treatments are subject to variability of results, they add expense and complication to a fracture treatment, and in all cases still leave at least some fluid damage in the fracture.

Other complications and difficulties exist in the current art of hydraulic fracture treatments. For example, the chemistry of fracturing gels, including the crosslinking of gels, creates complications when designing fracture treatments for a broad range of temperatures. After a fracture treatment, fracturing fluid that flows back to the surface must be disposed of, and the more fluid that is utilized in the treatment the greater the disposal risk and expense. Further, some fracturing fluids are not compatible with calcium brines, reducing an option for a higher density fracturing fluid and complicating fracture treatment designs in some circumstances.

Acid fracturing treatments are utilized to remove damage and/or open channels in the formation. The acid etches channels that, in theory, remain open after the hydraulic pressure is released and the formation relaxes back to a naturally pressured condition. It is desirable that the acid flow into and etch or remove damage from areas of the formation that do not flow well before the treatment. However, the highly permeable and naturally fractured areas of the formation naturally tend to accept fluid better and thereby take more of the acid than is desired. Therefore, fluid loss additives and diverting additives may be added to the acid fracturing treatment to block the high permeability channels and direct the treatment into lower permeability channels. To carry the fluid loss additives and to develop the desired fracture geometry, the acid fracturing fluid may be viscosified similar to a hydraulic fracturing treatment. The inclusion of viscosifiers and particulates in acid fracturing introduces potential damage and complications in a similar manner to hydraulic fracturing without acid.

Accordingly, there is a demand for further improvements in this area of technology.

SUMMARY

According to a first aspect, a method of fracturing a subterranean formation comprising at least in part shale formation, comprises: providing a carrier fluid; providing a particulate blend including a first amount of particulates having a first average particle size between about 100 and 2000 m and a second amount of particulates having a second average particle size between about three and twenty times smaller than the first average particle size, such that a packed volume fraction of the particulate blend exceeds 0.75; combining the carrier fluid and the particulate blend into a fracturing slurry; fracturing the formation with the fracturing slurry to create at least a fracture; and removing the second amount of particulates from the fracture.

According to a second aspect, a method of fracturing a subterranean formation, comprises providing a liquefied petroleum gas; providing a particulate blend including a first amount of particulates having a first average particle size between about 100 and 2000 m and a second amount of particulates having a second average particle size between about three and twenty times smaller than the first average particle size, such that a packed volume fraction of the particulate blend exceeds 0.75; combining the liquefied petroleum gas and the particulate blend into a fracturing slurry; fracturing the formation with the fracturing slurry to create at least a fracture; and removing the second amount of particulates from the fracture.

DESCRIPTION OF THE ILLUSTRATIVE EMBODIMENTS

Figure 1:
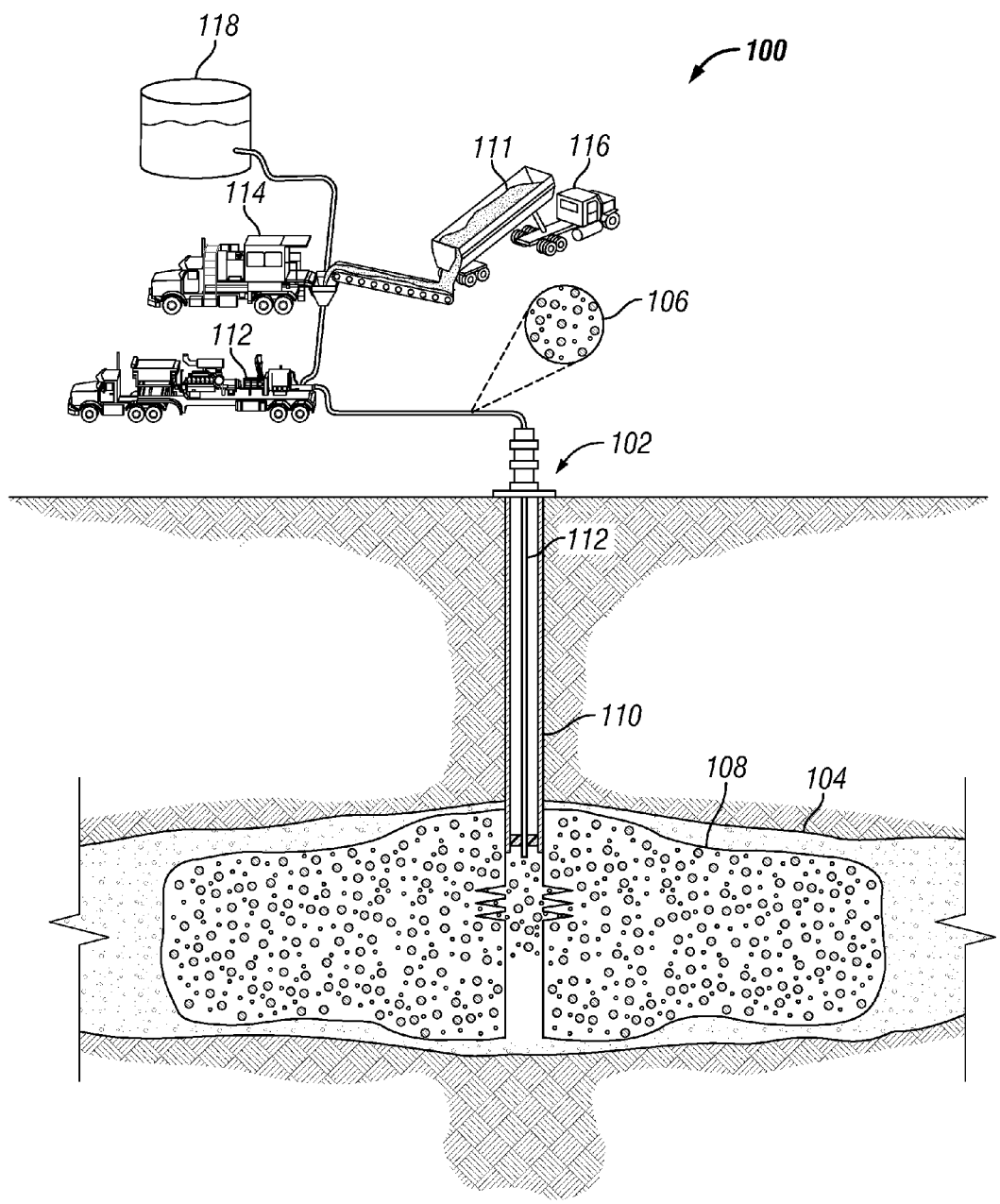
FIG. 1 is a schematic diagram of a system for a low damage fracturing treatment.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and that such further applications of the principles of the invention as illustrated therein as would normally occur to one skilled in the art to which the invention relates are contemplated and protected.

FIG. 1 is a schematic diagram of a system 100 for a low damage fracturing treatment. The system 100 includes a wellbore 102 in fluid communication with a formation of interest 104. The formation of interest 104 may be any formation wherein fluid communication between a wellbore and the formation is desirable, including a hydrocarbon-bearing formation, a water-bearing formation, a formation that accepts injected fluid for disposal, pressurization, or other purposes, or any other formation understood in the art. According to embodiments disclose herewith the formation of interest is a shale formation, especially a shale gas formation.

Shale gas, also known as gas shale, is conventional natural gas that is produced from reservoirs predominantly composed of shale with lesser amounts of other fine grained rocks rather than from more conventional sandstone or limestone reservoirs. The gas shales are often both the source rocks and the reservoir for the natural gas, which can be stored in three ways: adsorbed onto insoluble organic matter called kerogen, trapped in the pore spaces of the fine-grained sediments interbedded with the gas shale or confined in fractures within the shale itself.

Gas shales can be thick and laterally extensive. Drilling and production of gas shales in many cases is very similar to that for conventional natural gas reservoirs; however, due to lack of permeability, gas shales generally require more fracture stimulation.

According to a first aspect, the system 100 further includes a fracturing slurry 106 that includes a carrier fluid having optionally a viscosifying agent. The carrier fluid carrier fluids include hydratable gels (e.g. guars, poly-saccharides, xanthan, hydroxy-ethyl-cellulose, etc.), a cross-linked hydratable gel, a viscosified acid (e.g. gel-based), an emulsified acid (e.g. oil outer phase), an energized fluid (e.g. an $N_2$ or $CO_2$ based foam), and an oil-based fluid including a gelled, foamed, or otherwise viscosified oil. Additionally, the carrier fluid may be a brine, and/or may include a brine.

The viscosifying agent is present in lower amount than conventionally is included for a fracture treatment. The loading of a viscosifier, for example described in pounds of gel per 1,000 gallons of carrier fluid, is selected according to the particulate size (due to settling rate effects) and loading that the fracturing slurry 106 must carry, according to the viscosity required to generate a desired fracture 108 geometry, according to the pumping rate and casing 110 or tubing 112 configuration of the wellbore 102, according to the temperature of the formation of interest 104, and according to other factors understood in the art.

In certain embodiments, the low amount of a viscosifying agent includes a hydratable gelling agent in the carrier fluid at less than 20 pounds per 1,000 gallons of carrier fluid where the amount of particulates in the fracturing slurry 106 are greater than 16 pounds per gallon of carrier fluid. In certain further embodiments, the low amount of a viscosifier includes a hydratable gelling agent in the carrier fluid at less than 20 pounds per 1,000 gallons of carrier fluid where the amount of particulates in the fracturing slurry 106 are greater than 23 pounds per gallon of carrier fluid. In certain embodiments, a low amount of a viscosifier includes a visco-elastic surfactant at a concentration below 1% by volume of carrier fluid. In certain embodiments, the low amount of a viscosifier includes the carrier fluid with no viscosifier included. In certain embodiments a low amount of a viscosifier includes values greater than the listed examples, because the circumstances of the system 100 conventionally utilize viscosifier amounts much greater than the examples. For example, in a high temperature application with a high proppant loading, the carrier fluid may conventionally indicate a viscosifier at 50 lbs. of gelling agent per 1,000 gallons of carrier fluid, wherein 40 lbs. of gelling agent, for example, may be a low amount of viscosifier. One of skill in the art can perform routine tests of fracturing slurries 106 based on certain particulate blends 111 in light of the disclosures herein to determine acceptable viscosifier amounts for a particular embodiment of the system 100.

According to a second aspect, the system 100 further includes a fracturing slurry 106 that is a liquefied petroleum gas system (LPG). LPG includes lower order alkanes such as propane. Also, a combination of a liquefied C2-C6 hydrocarbon and carbon dioxide mix as the fracturing slurry can also be used. As a lower order alkane, propane and butane are inherently non-damaging to formations, LPG with propane and butane is preferred.

While the fracturing slurry 106 described herein includes particulates, the system 100 may further include certain stages of fracturing fluids without particulates or with alternate mixtures of particulates. For example, a system 100 includes a pad fluid and/or a flush fluid in certain embodiments. In certain embodiments, the pad fluid may be free of particulates, but may also include particulates such as fluid loss additives, breakers, or other materials known in the art. Pad fluids, flush fluids, and other fluid stages for fracturing are well known in the art, and further description is not provided herein to avoid obscuring aspects of the present application.

In certain embodiments, the carrier fluid includes an acid. The fracture 108 is illustrated as a traditional hydraulic double-wing fracture, but in certain embodiments may be an etched fracture and/or wormholes such as developed by an acid treatment. The carrier fluid may include hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or a salt of any acid. In certain embodiments, the carrier fluid includes a poly-amino-poly-carboxylic acid, and is a trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate. The selection of any acid as a carrier fluid depends upon the purpose of the acid—for example formation etching, damage cleanup, removal of acid-reactive particles, etc., and further upon compatibility with the formation 104, compatibility with fluids in the formation, and compatibility with other components of the fracturing slurry and with spacer fluids or other fluids that may be present in the wellbore 102. The selection of an acid for the carrier fluid is understood in the art based upon the characteristics of particular embodiments of the system 100 and the disclosures herein.

The fracturing slurry 106 further includes a first amount of particulates having a first average particle size between about 100 and 2000 μm. In certain embodiments, the first amount of particulates may be a proppant, for example sand, ceramic, or other particles understood in the art to hold a fracture 108 open after a treatment is completed. In certain embodiments, the first amount of particulates may be a fluid loss agent, for example calcium carbonate particles or other fluid loss agents known in the art.

The fracturing slurry 106 further includes a second amount of particulates having a second average particle size between about three times and about ten, fifteen or twenty times smaller than the first average particle size. For example, where the first average particle size is about 100 μm (an average particle diameter, for example), the second average particle size may be between about 5 µm and about 33 µm. In certain preferred embodiments, the second average particle size may be between about seven and ten times smaller than the first average particle size.

In certain embodiments, the selection of the size for the first amount of particulates is dependent upon the characteristics of the propped fracture 108, for example the closure stress of the fracture, the desired conductivity, the size of fines or sand that may migrate from the formation, and other considerations understood in the art. In certain further embodiments, the selection of the size for the first amount of particulates is dependent upon the desired fluid loss characteristics of the first amount of particulates as a fluid loss agent, the size of pores in the formation, and/or the commercially available sizes of particulates of the type comprising the first amount of particulates.

In certain embodiments, the selection of the size of the second amount of particulates is dependent upon maximizing a packed volume fraction (PVF) of the mixture of the first amount of particulates and the second amount of particulates. A second average particle size of between about seven to ten times smaller than the first amount of particulates contributes to maximizing the PVF of the mixture, but a size between about three to twenty times smaller, and in certain embodiments between about three to fifteen times smaller, and in certain embodiments between about three to ten times smaller will provide a sufficient PVF for most systems 100. Further, the selection of the size of the second amount of particulates is dependent upon the composition and commercial availability of particulates of the type comprising the second amount of particulates. For example, where the second amount of particulates comprise wax beads, a second average particle size of four times (4×) smaller than the first average particle size rather than seven times (7×) smaller than the first average particle size may be used if the 4× embodiment is cheaper or more readily available and the PVF of the mixture is still sufficient to acceptably suspend the particulates in the carrier fluid.

In certain embodiments, the fracturing slurry 106 further includes a third amount of particulates having a third average particle size that is smaller than the second average particle size. In certain further embodiments, the fracturing slurry 106 may have a fourth or a fifth amount of particles. For the purposes of enhancing the PVF of the fracturing slurry 106, more than three or four particles sizes will not typically be required. Four example, a four-particle blend including 217 g of 20/40 mesh sand, 16 g or poly-lactic acid particles with an average size of 150 microns, 24 g of poly-lactic acid particles with an average size of 8 microns, and 53 g of $CaCO_3$ particles with an average size of 5 microns creates a particulate blend 111 having a PVF of about 0.863. In a second example, a three-particle blend wherein each particle size is 7× to 10× smaller than the next larger particle size creates a particulate blend 111 having a PVF of about 0.95. However, additional particles may be added for other reasons, such as the chemical composition of the additional particles, the ease of manufacturing certain materials into the same particles versus into separate particles, the commercial availability of particles having certain properties, and other reasons understood in the art.

In certain embodiments, the system 100 includes a pumping device 112 structured to create a fracture 108 in the formation of interest 104 with the slurry 106. The system 100 in certain embodiments further includes peripheral devices such as a blender 114, a particulates hauler 116, fluid storage tank(s) 118, and other devices understood in the art. In certain embodiments, the carrier fluid may be stored in the fluid storage tank 118, or may be a fluid created by mixing additives with a base fluid in the fluid storage tank 118 to create the carrier fluid. The particulates may be added from a conveyor 120 at the blender 114, may be added by the blender 114, and/or may be added by other devices (not shown).

In certain embodiments, one or more sizes of particulates may be pre-mixed into the particulate blend 111. For example, if the system 100 includes a first amount, second amount, and third amount of particulates, a particulate blend 111 may be premixed and include the first amount, second amount, and third amount of particulates. In certain embodiments, one or more particulate sizes may be added at the blender 114 or other device. For example, if the system 100 includes a first amount, second amount, and third amount of particulates, a particulate blend 111 may be premixed and include the first amount and second amount of particulates, with the third amount of particulates added at the blender 114. Any device configuration that includes a fracturing slurry 106 having the amounts of particulates for the particular embodiment of the system 100 is contemplated herein. In certain embodiments, the sum of all of the particulates in the fracturing slurry 106 exceeds 23 pounds per gallon of carrier fluid. In certain further embodiments, the sum of all of the particulates in the fracturing slurry 106 exceeds 30 pounds per gallon of carrier fluid.

In certain embodiments, the system includes a removal agent structured to remove the second amount of particulates from the fracture 108. In certain embodiments, the removal agent is a degradable material making up at least part of the second amount of particulates. For example, the second amount of particulates may be completely made from a degradable material, and after the fracture treatment the second amount of particulates degrades and flows from the fracture 108 in a fluid phase. In another example, the second amount of particulates includes a portion that is degradable material, and after the fracture treatment the degradable material degrades and the particles break up into particles small enough to flow from the fracture 108. In certain embodiments, the second amount of particulates exit the fracture by dissolution into a fluid phase or by dissolution into small particles and flowing out of the fracture.

In certain embodiments, the second amount of particulates include an acid precursor, and the removal agent includes a free acid corresponding to the acid precursor. The removal agent may be embedded in the second amount of particulates, included with a third amount of particulates, and/or added to the fracture 108 separately after the fracture treatment is performed.

In certain embodiments, the second amount of particulates include an acid precursor, and the removal agent includes an accelerating agent. Accelerating agents react readily with the solid acid-precursor and cause the removal of a small amount of material from the solid acid-precursor surface. In certain embodiments, the accelerating agent may be a solid acid-precursor, for example, in one embodiment the acid precursor is poly-lactic acid, and the accelerating agent poly-glycolic acid, which accelerates the hydrolysis of poly-lactic acid. Examples of accelerating agents include, but are not limited to, magnesium hydroxide, magnesium carbonate, dolomite (magnesium calcium carbonate), calcium carbonate, aluminum hydroxide, calcium oxalate, calcium phosphate, aluminum metaphosphate, sodium zinc potassium polyphosphate glass, and sodium calcium magnesium polyphosphate glass.

In certain embodiments, the dissolution of solid acid-precursors in acid fracturing may also be accelerated by the addition of certain soluble liquid additives. These accelerants may be acids, bases, or sources of acids or bases. These are particularly valuable at low temperatures (for example below about 135° C.), at which the solid acid-precursors hydrolyze slowly, relative to the time an operator would like to put a well on production after a fracturing treatment. Non-limiting examples of such soluble liquid additives that hydrolyze to release organic acids are esters (including cyclic esters), diesters, anhydrides, lactones and amides. A compound of this type, and the proper amount, that hydrolyzes at the appropriate rate for the temperature of the formation and the pH of the fracturing fluid is readily identified for a given treatment by simple laboratory hydrolysis experiments.

In certain embodiments, the accelerating agent may be a base, and may be added as a liquid or included as a solid. Suitable bases are sodium hydroxide, potassium hydroxide, and ammonium hydroxide. In certain embodiments, the accelerating agent may include alkoxides, water-soluble carbonates and bicarbonates, alcohols such as but not limited to methanol and ethanol, alkanol amines and organic amines such mono-ethanol amine and methyl amine. In certain embodiments, the accelerating agent includes acids, such as but not limited to hydrochloric acid, hydrofluoric acid, ammonium bifluoride, formic acid, acetic acid, lactic acid, glycolic acid, amino-poly-carboxylic acids (such as but not limited to hydroxyl-ethyl-imino-diacetic acid), poly-amino-poly-carboxylic acids (such as but not limited to hydroxyl-ethyl-ethylene-diamine-triacetic acid), salts—including partial salts—of the organic acids (for example, ammonium, potassium or sodium salts), and mixtures of these acids or salts. The organic acids may be used as their salts. In certain further embodiments, corrosion inhibitors are included with an acid. In certain embodiments, solid acid-precursors (e.g. as the degradable material), such as poly-lactic acid, are included in a particle with small amounts of the corresponding free acids (e.g. as the accelerating agent) also included in the solid particle.

Figure 2:
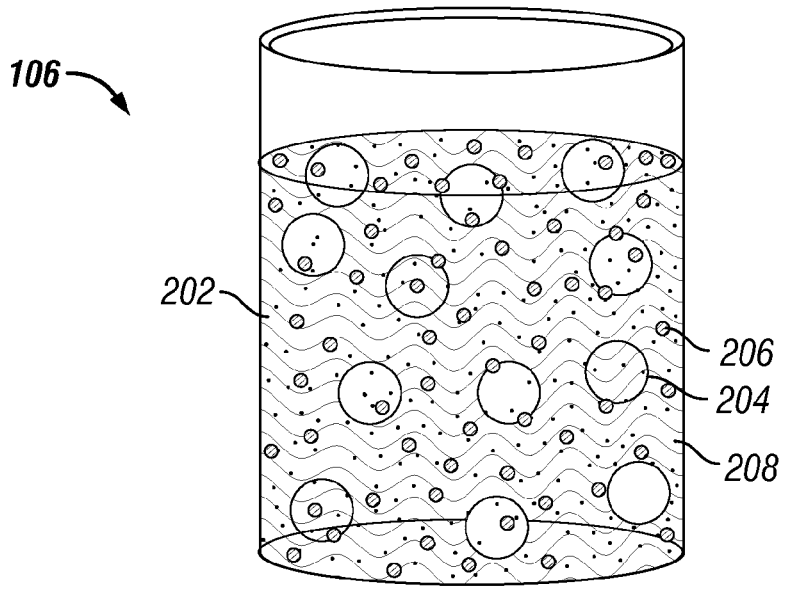
FIG. 2 is an illustration of a fracturing slurry.

FIG. 2 is an illustration of a fracturing slurry 106. The slurry 106 includes a carrier fluid 202 having a viscosifying agent. The slurry 106 further includes at least a first amount of particulates 204 and a second amount of particulates 206. In certain further embodiments the slurry 106 further includes a third amount of particulates 208, and may include additional amounts of particulates (not shown) where desired to increase the particulate PVF, to add particulates having certain chemical properties, and/or for additional considerations. In certain embodiments, the particulates 204, 206, 208 combine to have a PVF above 0.75 or above 0.80. In certain further embodiments the particulates 204, 206, 208 may have a much higher PVF approaching 0.95.

In certain embodiments, the amount of viscosifier in the carrier fluid 202 is less than about 20 lbs. of hydratable gel per 1,000 gallons of carrier fluid, and the amount of particulates 204, 206, 208 is greater than about 23 pounds per gallon of carrier fluid, and in certain embodiments greater than 26 pounds or greater than 30 pounds per gallon of carrier fluid. In certain embodiments, the amount of viscosifier in the carrier fluid 202 is less than about 1% surfactant concentration by volume of carrier fluid, and the amount of particulates 204, 206, 208 is greater than about 23 pounds per gallon of carrier fluid, and in certain embodiments greater than 26 pounds or greater than 30 pounds per gallon of carrier fluid. In certain embodiments, the carrier fluid 202 has a low amount of a viscosifier which is a zero amount of viscosifier—for example a potassium chloride brine with no viscosifying agent—and the amount of particulates 204, 206, 208 exceeds about 20 pounds per gallon of carrier fluid.

Figure 3:
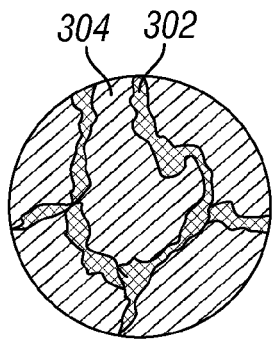
FIG. 3 is an illustration of a removal agent including a degradable material comprising at least a portion of an amount of a particulate.

FIG. 3 is an illustration of a removal agent including a degradable material 302 comprising at least a portion of an amount of a particulate 304. The particulate 304 includes any of the first amount of particulates, the second amount of particulates, and/or the third amount of particulates. The degradable material 302 in certain embodiments comprises a wax, an oil-soluble resin, and/or a material soluble in hydrocarbons. In certain embodiments, the degradable material 302 includes at least one of a lactide, a glycolide, an aliphatic polyester, a poly(lactide), a poly(glycolide), a poly($\epsilon$-caprolactone), a poly(orthoester), a poly(hydroxybutyrate), an aliphatic polycarbonate, a poly(phosphazene), and a poly(anhydride). In certain embodiments, the degradable material includes at least one of a poly(saccharide), dextran, cellulose, chitin, chitosan, a protein, a poly(amino acid), a poly(ethylene oxide), and a copolymer including poly(lactic acid) and poly(glycolic acid). In certain embodiments, the degradable material includes a copolymer including a first moiety which includes at least one functional group from a hydroxyl group, a carboxylic acid group, and a hydrocarboxylic acid group, the copolymer further including a second moiety comprising at least one of glycolic acid and lactic acid.

Figure 4:
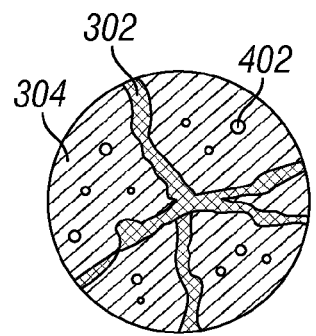
FIG. 4 is an illustration of a removal agent including a degradable material and a reactive compound.

FIG. 4 is an illustration of a removal agent including a degradable material 302 and a reactive compound 402. In certain embodiments, the removal agent includes a reactive compound 402 that may be included as one of the particulates, and/or included as a part of a particle 304 as illustrated in FIG. 4. The reactive compound 402 includes a material that reacts with the degradable material 302 and/or a hydrolysis product of the degradable material 302. The reactive compound 402 may be included in the second amount of particulates and/or the third amount of particulates.

In certain embodiments, the reactive compound 402 includes at least one soluble liquid selected from esters, diesters, anhydrides, lactones, sodium hydroxide, potassium hydroxide, amides, amines, carbonates, bicarbonates, alcohols, alkanol amines, ammonium hydroxide, weak acids, strong acids, and/or organic acids. In certain embodiments, the reactive compound 402 is included as a soluble liquid in the carrier fluid, and/or included as a solid on one of the particulates, where the reactive compound 402 dissolves into the carrier fluid and/or formation fluid after time and/or contact with downhole fluids and conditions.

In certain embodiments, the reactive compound 402 includes at least one of ground quartz, oil soluble resin, degradable rock salt, clay, and zeolite. In certain further embodiments, the reactive compound 402 is a clay selected from kaolinite illite, chlorite, bentonite, and monmorillonite. In certain further embodiments, the reactive compound 402 is a zeolite selected from chabazite, clinoptiloloite, heulandite, and/or a synthetic zeolite. In certain embodiments, the reactive compound 402 includes magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and/or sodium calcium magnesium polyphosphate glass.

A few descriptive, non-limiting examples are provided. In one embodiment, the removal agent includes a degradable material 302 from which the second amount of particulates is made, and a reactive compound 402 included on the third amount of particulates. The reactive compound 402 reacts with the degradable material 302 and a hydrolysis product of the degradable material 302. After the fracture treatment is completed, the reactive compound 402 on the third amount of particulates dissolves into the fluids in the fracture 108 and assists in the dissolution of the second amount of particulates. The dissolved second amount of particulates flow out of the fracture in a fluid phase and the third amount of particulates are small enough to flow through the fracture 108 and out of the wellbore 102 when the second amount of particulates are no longer present.

In one embodiment, the removal agent includes a degradable material 302 and a reactive compound 402 within the second amount of particulates. After the fracture treatment is completed, the reactive compound 402 embedded with the second amount of particles assist in the dissolution of the degradable material 302, breaking the second amount of particulates up into tiny particles that flow out of the fracture 108.

In one embodiment, the removal agent includes a degradable material 302 within the second amount of particulates and a reactive compound 402 in the fluid phase within the carrier fluid. The reactive compound 402 has a low rate of reaction with the degradable material 302 at surface temperatures and conditions, and is combined with the second amount of particulates within the fracturing slurry 106 at the blender 114 just before pumping into the wellbore 102. After the fracture treatment is completed, the downhole temperature brings a rate of the reaction between the reactive compound 402 with the degradable material 302 up to a rate where a reasonable shut-in period allows dissolution of the second amount of particulates. Any configuration of degradable materials 302, reactive compounds 402, and various particle sizes consistent with the disclosures herein is contemplated within the scope of the present application.

Figure 5:
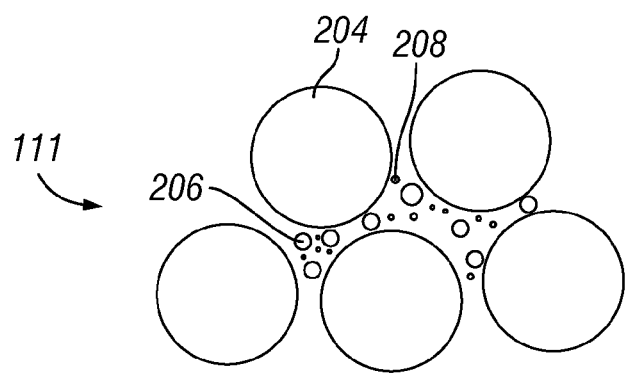
FIG. 5 is an illustration of a particulate blend.

FIG. 5 is an illustration of a particulate blend 111. The particles of varying sizes 204, 206, 208 in the particulate blend 111 cooperate to increase the PVF of the blend. In certain embodiments, at least some of the particle sizes 204, 206, 208 may be pre-blended before adding to the carrier fluid 202 and creating the fracturing slurry 106.

The schematic flow diagram (FIG. 6) and related description which follows provides an illustrative embodiment of performing operations for low damage fracturing. Operations illustrated are understood to be exemplary only, and operations may be combined or divided, and added or removed, as well as re-ordered in whole or part, unless stated explicitly to the contrary herein.

Figure 6:
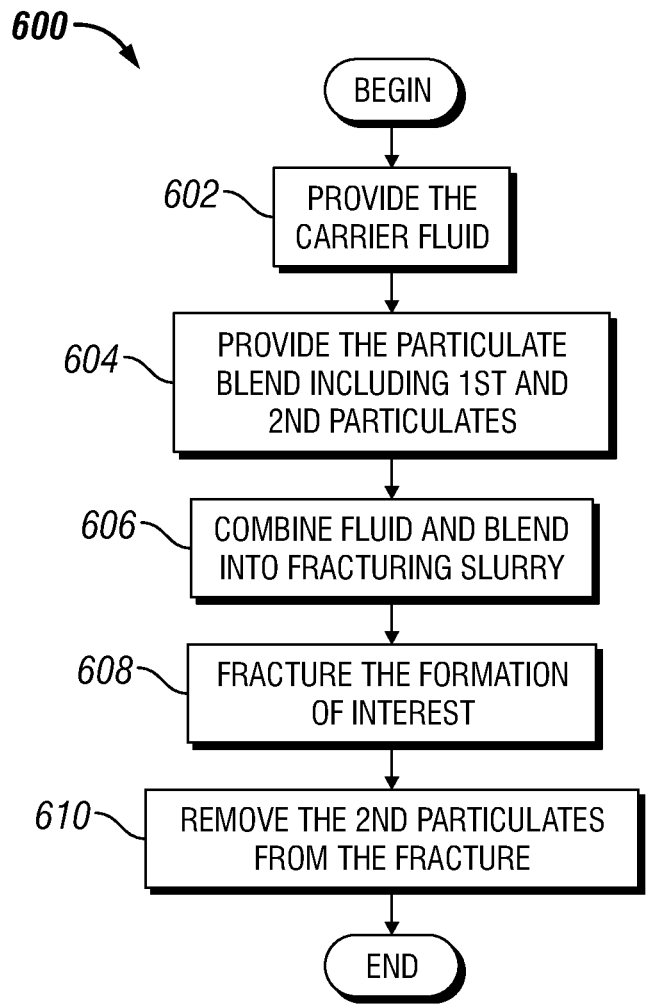
FIG. 6 is a schematic flow diagram of a procedure for low damage fracturing treatment.

FIG. 6 is a schematic flow diagram of a procedure 600 for low damage fracturing treatment. The procedure 600 includes an operation 602 for providing a carrier fluid 202 having a low amount of a viscosifier. The procedure 600 further includes an operation 604 for providing a particulate blend 111 having a first amount of particles 204 and a second amount of particles 206. The first amount of particles 204 have an average particle size between about 100 and 2000 μm, the second amount of particles 206 have a second average particle size between about three and fifteen times smaller than the first amount of particles 204, and the PVF of the particulate blend 111 exceeds about 0.80.

The procedure 600 further includes an operation 606 to combine the carrier fluid 202 and the particulate blend 111 into a fracturing slurry 106. The procedure 600 further includes an operation 608 to fracture the formation of interest 104. The procedure 600 further includes an operation 610 to remove the second amount of particulates 206 from the fracture 108.

As is evident from the figures and text presented above, a variety of embodiments according to the present invention are contemplated.

In an exemplary embodiment, a method includes providing a carrier fluid having a low amount of a viscosifier, providing a particulate blend including a first amount of particulates having a first average particle size between about 100 and 2000 μm and a second amount of particulates having a second average particle size between about three and fifteen times smaller than the first average particle size, such that a packed volume fraction (PVF) of the particulate blend exceeds 0.80. The method further includes combining the carrier fluid and the particulate blend into a fracturing slurry, fracturing a formation of interest with the fracturing slurry, and removing the second amount of particulates from the propped fracture.

In certain further embodiments, the method includes the second amount of particulates being a degradable material, where removing the second amount of particulates includes degrading the degradable material. In certain further embodiments, the second amount of particulates includes a reactive compound that reacts with at least one of the degradable material and a hydrolysis product of the degradable material. In certain embodiments, the particulate blend further includes a third amount of particulates having a third average particulate size that is smaller than the second average particulate size. In certain embodiments, at least one of the second and third amount of particulates include a degradable material, and at least one of the second and third amount of particulates includes a reactive compound that reacts with the degradable material and/or a hydrolysis product of the degradable material. In certain embodiments, the first amount of particulates include one of a proppant and a fluid loss additive.

In an exemplary embodiment, a system includes a wellbore in fluid communication with a formation of interest, a fracturing slurry including a carrier fluid having a low amount of a viscosifier, a first amount of a particulates including a first average particle size between about 100 and 2000 μm, a second amount of particulates having a second average particle size between about three and ten times smaller than the first average particle size, a pumping device structured to create a fracture in the formation of interest with the fracturing slurry; and a removal agent structured to remove the second amount of particulates from the fracture.

In certain embodiments, a sum of all of the particulates in the fracturing slurry is greater than about 23 pounds per gallon of the carrier fluid. In certain embodiments, the first amount of particulates is a proppant, and the fracture is a propped fracture. In certain embodiments, the low amount of a viscosifier includes a hydratable gelling agent at less than 20 lbs. per 1,000 gallons of carrier fluid, a visco-elastic surfactant at a concentration less than 1% by volume of carrier fluid, or no viscosifier in the carrier fluid.

In certain embodiments, the carrier fluid includes a brine with hydratable gel, a brine with cross-linked hydratable gel, a brine, an energized fluid, and/or an oil-based fluid. In certain embodiments, the carrier fluid includes an acid, a viscosified acid, an emulsified acid, an energized fluid, and an oil-based fluid, and in certain further embodiments, the first amount of particulates is a fluid loss agent. In certain embodiments, the carrier fluid includes hydro-chloric acid, hydro-fluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or an acid salt. In certain further embodiments, the carrier fluid includes at least one poly-amino-poly-carboxylic acid such as trisodium hydroxyl-ethyl-ethylene-diamine triacetate, mono-ammonium salts of hydroxyl-ethyl-ethylene-diamine tetra-acetate, and/or mono-sodium salts of hydroxyl-ethyl-ethylene-diamine tetra-acetate.

In certain embodiments, the removal agent includes a degradable material that makes up at least a portion of the second amount of particulates, and the second amount of particulates exit the fracture by one of dissolution into a fluid phase and/or by partial dissolution into small particles and flowing out of the fracture. In certain embodiments, the second amount of particulates include an acid precursor, and the removal agent includes a free acid corresponding to the acid precursor, where the removal agent is embedded in the particles of the second amount of particulates. In certain embodiments, the second amount of particulates includes an acid precursor, and the removal agent includes an accelerating agent structured to readily react with the acid precursor.

In an exemplary embodiment, a system includes a wellbore in fluid communication with a formation of interest, a fracturing slurry including a carrier fluid having a low amount of a viscosifier, an amount of proppant having a first average particle size between about 200 and 2000 µm, a second amount of particulates having a second average particle size between about three and ten times smaller than the first average particle size, and a third amount of particulates comprising a third average particle size, where the third average particles size is smaller than the second average particle size. In certain embodiments, the sum of all of the particulates in the fracturing slurry is greater than about 23 pounds per gallon of the carrier fluid, and the system further includes a pumping device structured to create a propped fracture in the formation of interest with the fracturing slurry and a removal agent structured to remove the second amount of particulates and/or the third amount of particulates from the propped fracture.

In certain embodiments, the removal agent includes a degradable material including at least a portion of the second amount of particulates and/or the third amount of particulates. In certain embodiments, the degradable material includes a wax, an oil-soluble resin, and/or a material soluble in hydrocarbons. In certain embodiments, the degradable material includes at least one material selected from the list consisting of: a lactide, a glycolide, an aliphatic polyester, a poly(lactide), a poly(glycolide), a poly(ε-caprolactone), a poly(orthoester), a poly(hydroxybutyrate), an aliphatic polycarbonate, a poly(phosphazene), and a poly(anhydride). In certain embodiments, the degradable material includes at least one member selected from the list consisting of: a poly(saccharide), dextran, cellulose, chitin, chitosan, a protein, a poly(amino acid), a poly(ethylene oxide), and a copolymer including poly(lactic acid) and poly(glycolic acid). In certain embodiments, the degradable material includes a copolymer including a first moiety comprising at least one member selected from the functional groups consisting of a hydroxyl group, a carboxylic acid group, and a hydrocarboxylic acid group, the copolymer further including a second moiety comprising at least one of glycolic acid and lactic acid. In certain embodiments, the removal agent further includes a reactive compound making up at least a portion of the second amount of particulates and/or the third amount of particulates. The reactive compound is structured to react with one of the degradable material and a hydrolysis product of the degradable material.

In certain embodiments, the reactive compound includes at least one soluble liquid such as esters, diesters, anhydrides, lactones, sodium hydroxide, potassium hydroxide, amides, amines, carbonates, bicarbonates, alcohols, alkanol amines, ammonium hydroxide, weak acids, strong acids, and/or organic acids. In certain embodiments, the reactive compound includes ground quartz, oil soluble resin, degradable rock salt, clay, and/or zeolite. In certain embodiments, the reactive compound is a clay including kaolinite, illite, chlorite, bentonite, and/or montmorillonite. In certain embodiments, the clay is a zeolite selected from chabazite, clinoptilolite, heulandite, and/or a synthetic zeolite. In certain embodiments, the reactive compound includes magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and/or sodium calcium magnesium polyphosphate glass. In certain embodiments, the second average particle size is between about seven and ten times smaller than the first average particle size.

In embodiments where the slurry is adequately stable while containing a large amount of proppant, and essentially little or no viscosifier, the slurry may be deemed "ready to use" treatment fluid, possibly prepared away from the wellsite, and then subsequently just pumped at the rig without any blending equipment. In some instances, this could eliminate the need for injecting a PAD fluid into the wellbore.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of hydraulic fracturing a subterranean formation, comprising:
   combining into a fracturing slurry, away from the wellsite, a carrier fluid having a low amount of a viscosifier and a particulate blend including a first amount of particulates having a first average particle size between about 100 and 2000 µm and a second amount of particulates having a second average particle size between about three and fifteen times smaller than the first average particle size; wherein the packed volume fraction (PVF) of the particulate blend exceeds 0.80;
   pumping the fracturing slurry without blending it at the rig;
   fracturing a formation of interest using the prepared fracturing slurry.

2. The method of claim 1, wherein a sum of all of the particulates in the fracturing slurry is greater than about 16 pounds per gallon of the carrier fluid.

3. The method of claim 2, wherein the second amount of particulates further comprise a reactive compound that reacts with at least one of the degradable material and a hydrolysis product of the degradable material.

4. The method of claim 2, wherein the particulate blend further includes a third amount of particulates having a third average particulate size that is smaller than the second average particulate size.

5. The method of claim 4, wherein at least one of the second and third amount of particulates comprises a degradable material.

6. The method of claim 5, wherein at least one of the second and third amount of particulates comprises a reactive compound that reacts with at least one of the degradable material and a hydrolysis product of the degradable material.

7. The method of claim 1, wherein the viscosifier includes a member selected from the list consisting of a hydratable gelling agent at less than 20 lbs per 1,000 gallons of carrier fluid, a visco-elastic surfactant at a concentration less than 1% by volume of carrier fluid.

8. The method of claim 1, wherein the second amount of particulates comprise a degradable material.

9. The method of claim 1, wherein the first amount of particulates comprise one of a proppant and a fluid loss additive.

10. The method of claim 1, wherein the carrier fluid comprises a fluid selected from the fluids consisting of a brine with hydratable gel, a brine with cross-linked hydratable gel, a brine, an energized fluid, and an oil-based fluid.

11. The method of claim 1, wherein the carrier fluid comprises a fluid selected from the fluids consisting of an acid, a viscosified acid, an emulsified acid, an energized fluid, and an oil-based fluid, and wherein the first amount of particulates is a fluid loss agent.

12. The method of claim 1, wherein the carrier fluid comprises at least one fluid selected from the fluids consisting of hydro-chloric acid, hydro-fluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and an acid salt.

13. The method of claim 12, wherein the carrier fluid comprises at least one poly-amino-poly-carboxylic acid selected from the group consisting of trisodium hydroxyl-ethyl-ethylene-diamine triacetate, mono-ammonium salts of hydroxyl-ethyl-ethylene-diamine tetra-acetate, and mono-sodium salts of hydroxyl-ethyl-ethylene-diamine tetra-acetate.

* * * * *